United States Patent [19]

Collong et al.

[11] Patent Number: 6,008,314
[45] Date of Patent: Dec. 28, 1999

[54] AMINOURETHANE HARDENERS, EPOXIDE-BASED COATING MEDIA AND THE USE THEREOF

[75] Inventors: Wilfried Collong, Wermelskirchen; Werner Lenhard, Wuppertal; Robert Besold, Nürnberg; Uwe Neumann, Sankt Augustin, all of Germany

[73] Assignee: Herberts GmbH, Wuppertal, Germany

[21] Appl. No.: 09/029,368

[22] PCT Filed: Jun. 21, 1997

[86] PCT No.: PCT/EP97/03268

§ 371 Date: May 14, 1998

§ 102(e) Date: May 14, 1998

[87] PCT Pub. No.: WO97/49749

PCT Pub. Date: Dec. 31, 1997

[30] Foreign Application Priority Data

Jun. 25, 1996 [DE] Germany .............. 196 25 345

[51] Int. Cl.⁶ .............. C08G 59/44; C08G 64/00
[52] U.S. Cl. .............. 528/123; 528/121; 528/370; 427/386; 427/407.1; 427/410
[58] Field of Search ............... 528/123, 121, 528/370; 427/386, 407.1, 410

[56] References Cited

U.S. PATENT DOCUMENTS

| | | | |
|---|---|---|---|
| 4,122,069 | 10/1978 | Meyer | 528/93 |
| 4,197,389 | 4/1980 | Becker et al. | 528/103 |
| 4,198,389 | 4/1980 | Becker | 528/103 |
| 4,806,611 | 2/1989 | Hoenel et al. | 528/45 |
| 4,835,289 | 5/1989 | Brindöpke | 549/229 |
| 4,886,845 | 12/1989 | Becker et al. | 523/403 |
| 4,892,954 | 1/1990 | Brindöpke | 549/229 |
| 5,032,629 | 7/1991 | Hansen | 523/414 |
| 5,123,458 | 6/1992 | Hoenel et al. | 564/367 |
| 5,596,030 | 1/1997 | Walker et al. | 523/404 |
| 5,677,006 | 10/1997 | Hoenel et al. | 427/372.2 |
| 5,707,741 | 1/1998 | Hoenel | 428/413 |
| 5,855,961 | 1/1999 | Hoenel et al. | 427/372.2 |

FOREIGN PATENT DOCUMENTS

| | | |
|---|---|---|
| 2138749 | 6/1995 | Canada . |
| 0 000 605 | 2/1979 | European Pat. Off. . |
| 0 387 418 | 9/1990 | European Pat. Off. . |
| 0 535 794 | 4/1993 | European Pat. Off. . |
| 35 29 263 | 2/1987 | Germany . |
| 36 00 602 | 7/1987 | Germany . |
| 43 44 510 | 6/1995 | Germany . |
| 36 43 751 | 6/1998 | Germany . |
| 3-275709 | 12/1991 | Japan . |
| WO 84/03701 | 9/1984 | WIPO . |

*Primary Examiner*—James J. Seidleck
*Assistant Examiner*—Sanza L. McClendon
*Attorney, Agent, or Firm*—Pillsbury Madison & Sutro LLP

[57] ABSTRACT

Aminourethane hardeners, suitable for aqueous epoxide-based coating media, otainable by the reaction of A) aminourethanes which are obtainable by the reaction of
  a) compounds comprising at least one cyclic carbonate group, and
  b) amines comprising at least one primary amino group wherein the ratio of the number of carbonate groups to that of amino groups is 1:10 to 1:1.1, with
B) water-thinnable epoxide compounds, obtainable from
  c) polyalkylene polyethers comprising a primary and/or secondary α-amino group and an ω-alkyl ether or aryl ether group and/or polyatkylene polyethers comprising two primary and/or secondary α,ω-amino groups, each with a weight average molecular weight of 200 to 20,000, with
  d) epoxide compounds comprising at least two epoxide groups per molecule and an equivalent weight of 100 to 2000, wherein the ratio of the number of amino groups of component c) to the epoxide groups of component d) is 1:2 to 1:20, and the epoxide equivalent weight of the condensation products obtained from c) and d) is between 150 and 8000.

14 Claims, No Drawings

AMINOURETHANE HARDENERS, EPOXIDE-BASED COATING MEDIA AND THE USE THEREOF

This application is the national phase of international application PCT/EP97/03268 filed Jun. 21, 1997 which designated the U.S.

FIELD OF THE INVENTION

This invention relates to epoxide-aminourethane addition products, and to coating media based on aqueous epoxide systems which contain the epoxide-aminourethane addition products as hardeners. The invention also relates to the use of the epoxide-aminourethane addition products for multilayer coating, particularly in the field of coating vehicles and vehicle parts.

BACKGROUND OF THE INVENTION

Due to environmental protection regulations becoming more and more stringent, aqueous systems for the coating of articles are becoming increasingly important. The properties of these systems, have to measure up to those of conventional, i.e. solvent-containing, systems. Amongst coldhardening "aqueous lacquers", water-thinnable epoxide resin systems have become increasingly important. These two-component (2C) systems have outstanding properties. The following advantageous properties should be emphasised: no solvent content or only a low solvent content, non-inflammable, no or little odour, easily worked, low sensitivity to wet coats underneath, good drying properties and rapid hardening throughout, very good adhesion to most substrates, very good intermediate coat adhesion, good protection of metals from corrosion and ease of cleaning of operating devices directly after use.

Thus non-ionically dispersed epoxide resin systems in particular, such as those described in DE-A-36 43 751, with aqueous amine-based hardeners such as those disclosed in EP-A-0 000 605, exhibit many of these outstanding properties, so that they have diverse uses as coating media. A disadvantage of these systems, however, is that they do not produce defect-free surfaces for certain lacquer applications.

EP-A-0 387 418 describes hardeners for aqueous epoxide systems, which are produced by the reaction of polyalkylene polyether polyamines with polyepoxide compounds and by reacting the epoxide-functional product which is obtained with primary or secondary polyamines to form an amine-functional final product. These systems are particularly suitable for the production of sealing compositions, adhesives, mouldings and laminates. When used as a primer surfacer or primer coat in a multi-layer coating they have the disadvantage of an unsatisfactory rubbing-down capacity. Due to their pronounced thermoplasticity, the abrasive paper becomes clogged after a short time and the surface is damaged. Moreover, an unsatisfactory resistance to run-off is obtained with these coating media.

DE-A43 44 510 describes aqueous coating media comprising epoxide-based binder vehicles and aminourethane-based hardeners. Coatings produced from these coating media can in fact be rubbed down, but it has been shown that the surface quality is unsatisfactory. The surface quality can in fact be improved by the addition of water-thinnable polyurethane resins, but this is again achieved at the cost of the rubbing-down capacity.

SUMMARY OF THE INVENTION

The object of the present invention was therefore to provide amine hardeners for aqueous epoxide systems, which impart a satisfactory processing time and a high resistance to run-off to coating media produced from them, and which result in coatings having defect-free surfaces and a good rubbing-down capacity in the dry and wet states.

It has been shown that this object is achieved by amine-functional epoxide-aminourethane addition products, hereinafter called aminourethane hardeners. Therefore, the present invention firstly relates to aminourethane hardeners which are suitable for aqueous epoxide-based coating media and which are obtainable by the reaction of A) one or more aminourethanes which are obtainable by the reaction of
  a) compounds comprising at least one 2-oxo-1,3-dioxolane group and/or 2-oxo-1,3-dioxane group, hereinafter denoted as a cyclic carbonate group, with
  b) one or more amines comprising at least one primary amino group, wherein the ratio of the number of cyclic carbonate groups to the number of primary amine groups is 1:10 to 1:1.1, with B) one or more water-thinnable epoxide compounds, which are obtainable by the reaction of
  c) one or more polyalkylene polyethers comprising at least one primary and/or secondary α-amino group and an ω-alkyl ether or aryl ether group and/or one or more polyalkylene polyethers comprising two primary and/or secondary α,ω-amino groups, each with a weight average molecular weight (Mw) of 200 to 20,000, with
  d) one or more epoxide compounds comprising at least two epoxide groups per molecule and an equivalent weight of 100 to 2000, wherein the ratio of the number of primary and/or secondary amino groups of component c) to the epoxide groups of component d) is 1:2 to 1:20, and the epoxide equivalent weight of the condensation products obtained from c) and d) is between 150 and 8000, and C) optionally one or more amines which are different from A) and which comprise at least one primary amino group.

DETAILED DESCRIPTION OF THE INVENTION

In particular, the compounds which contain cyclic carbonate groups and which are used in component A)a) are those which contain one, or preferably two or more, 2-oxo-1,3-dioxolane or 2-oxo-1,3-dioxane groups, wherein these are preferably terminal groups. Component A)b) comprises amines which contain at least one primary, preferably a plurality of primary and optionally secondary and tertiary amino groups also. The polyalkylene polyethers of compartment B)c) are those comprising an alpha-terminal secondary or primary amine group and an omega-terminal all ether or aryl ether group; the polyalkylene polyethers which comprise at least two primary and/or secondary amine groups are those which comprise alpha, omega-terminal primary and/or secondary amine groups. During the production of component B), the ratio of the number of primary and secondary amine groups of component c) to the number of epoxide groups of component d) is 1:2 to 1:20, preferably 1:4 to 1:8; the epoxide equivalent weight (the molecular weight divided by the number of epoxide groups present) of component B) is 150 to 8000, preferably 250 to 1000.

Compounds (A) can be added, on their own or preferably in combination with customary polyamines (C), to hydrophilic epoxide resins (B), and can be used in this form as a hardener component for aqueous epoxide systems.

Surprisingly, the requisite properties mentioned above, such as improved surface quality, resistance to run-off and a good rubbing-down capacity, are thereby attained without the previous good properties of the aqueous two-component (2C) epoxide systems being impaired.

Customary cyclic carbonates, which can be produced in the known manner by the reaction of carbon dioxide with epoxide compounds (see WO-A-84/03701, DE-A-35 29 263 and DE-A-36 00 602, for example), can be used as component (a) for the production of aminourethanes (A). These epoxide compounds are preferably polyglycidyl ethers based on polyhydric, preferably dihydric, alcohols or phenols, hydrogenation products of these phenols and/or on novolacs (reaction products of mono or dihydric phenols with aldehydes, particularly formaldehyde, in the presence of acidic catalysts). The epoxide equivalent weights of these epoxide compounds are preferably between 100 and 2000, particularly between 100 and 350. The epoxide equivalent weight is the molecular weight divided by the number of epoxide groups.

Examples of suitable epoxide compounds are described in the handbook "Epoxidverbindungen and Epoxidharze" by A. M. Paquin, Springer Verlag, Berlin 1958, Chapter IV, and in the "Handbook of Epoxy Resins" by Lee, Nevill, McGraw-Hill Book Co., 1967, Chapter 2. The epoxide compounds may be used singly or in combination.

Compounds which can also be used as component (a) are the usual cyclic carbonates which are obtained by the reaction of carbonic acid esters, such as dimethyl carbonate, diethyl carbonate, diphenyl carbonate, ethylene carbonate or propylene carbonate for example, with polyols, wherein the polyols contain at least four hydroxyl groups, two of which react in each case with carbionic acid esters by a transesterification process to form cyclic five-membered ring or six-membered ring carbonates. Examples of polyhydric polyols include: diglycerol triglycerol polyglycerol, sugar alcohols (e.g. xylitol, mannitol, erythutol), di- and trimethylolpropane, di- and trimethylolethane, pentaerythritol and dipentaerythritol. Diglycerol is particularly preferred in this respect.

Production of cyclic carbonates from the polyols is effected in the manner familiar to one skilled in the art, particularly by the reaction of the polyols with carbonic acid esters in the stoichiometric ratio of 1.0:1.0 to 1.0; 10.0 (ratio of 1,2- or 1,3-glycol groups to carbonate groups), particularly with catalysis. Suitable catalysts include basic catalysts in particular, such as carbonates, bicarbonates, alcoholates, carboxylates, hydroxides or oxides of alkali metals and alkaline earth metals, and also include customary Lewis acids, such as organic compounds of di- or tetravalent tin or titanium, e.g. tin(II) octoate, tin(II) laurate, dibutyltin oxide or titanium tetrabutylate. The catalysts may be added in an amount of 0.01 to 1.0% by weight with respect to the polyol and carbonic acid ester, for example.

Amines, preferably polyamines, which contain primary amine groups capable of reacting with the carbonate groups of (a) can be used as amine component (b) for the production of aminourethanes (A). These amines may be polyamines, amine-epoxide addition products and/or modified derivatives thereof for example.

Examples of suitable polyamines include polyalkylene amines such as diethylenetetramne, triethylenetiamine, tetraethylenepentamine, pentaethylenehexamine, propylenediamine and dipropylene triamine, and also 2,2,4- and/or 2,4,4-trimrethylhexamethylenediamine, bis-(3-aminopropyl)-amine, 1,4-bis-(3'-aminopropyl)-piperazine, N,N-bis(3-aminopropyl)ethyl-diamine, neopentanediamine, 2-methyl-1,5-pentanedlamine, 1,3-diaminopentane and hexamethylenediamine, as well as cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4diaminocyclohexane, isophoronediamine and reaction products thereof, 4;4'-diaminocyclohexylmethane and -propane, 2,2-bis-(4aminocyclohexyl)-methane and -propane, 3,3'-dimethyl-4,4'-diaminodicyclohexylmethane, 3-amino-1-cyclohexylamine-propane, and 1,3- and 1,4-bis (aminomethyl)-cyclohexane.

Araliphatic amines are also suitable, particularly those in which aliphatic amino groups are present, e.g. meta- and para-xylylenediamine.

Examples of amine-epoxide addition products include the reaction products of polyamines, such as ethylenediarnine, propylenediamine, hexamethylenediamine, 2,2,4- and 2,4, 4-trimethylhexamethylenediamine, meta-xylylenediamine and/or bis-(aminomethyl)-cyclohexane, with terminal mono- or polyepoxides, such as propylene oxide, hexene oxide or cyclohexene oxide, or with glycidyl ethers such as phenyl glycidyl ether, tert-butyl glycidyl ether, ethylhexyl glycidyl ether or butyl glycidyl ether, or with glycidyl esters, such as the glycidyl ester of versatic acid for example, or with the aforementioned polyglycidyl ethers and esters.

Said amines can be used on their own or as mixtures. They are preferably selected so that they contain at least one, and preferably more than one, free primary amino group.

The reaction of components (a) and (b) is generally conducted in the requisite stoichiometric ratios and by customary methods, e.g. at elevated temperatures, optionally with the use of inert solvents. Reaction in the presence of solvents which are inert to the cyclocarbonate group constitutes a preferred variant of the method. The amine number (titration with perchloric acid) and the cyclocarbonate equivalent number (titration with potassium hydroxide solution) can form the basis of the estimation of the starting materials and of the final products, and can be used for monitoring the reaction. During the reaction of components (a) and (b) the amine compounds can be added to the reaction singly or as mixtures, simultaneously or chronologically in succession, and optional dissolved in inert solvents.

The reaction is conducted under reaction and process conditions which are sufficiently mnild so that the cyclocarbonate groups of component (a) only react with the primary amino groups of component (b), without the corresponding reaction also taking place with the secondary amino groups which may be present, which are considerably less reactive. Customary methods familiar to one skilled in the art can be employed. The reaction temperatures should be as low as possible, in order to prevent the formation also of cyclic urea derivatives from urethane structures of polyalkylene polyamines.

Examples of inert solvents include aromatic hydrocarbons such as xylene and toluene, alcohols suich as methanol, ethanol, butanols, pentanols, 1,2-propanediol or ethylene glycol, and gycol ethers such as methoxyethanol, ethoxyethanol, methoxypropanol, butoxyethanol and methoxybutanol, glycol dimethyl ethers and diglycol dimethyl ethers. Solvents are preferably selected which can easily be distilled off after the reaction is complete, or which are not troublesome subsequently in the aqueous formulation. In the latter case, the solvents are preferably merely used in an arrmunt which is sufficient to reduce the viscosity to a manipulable level. Esters and ketones are only of limited suitability, due to their potential reactivity with the components.

During the reaction of components a1) and a2), the reaction temperature falls within the range from 50° C. to 150° C. for example; the lower temperature is limited by solubility and viscosity, and the upper temperature is limited by the tendency of secondary and subsequent reactions to occur and. by the boiling point of the solvent. A temperature between 80° C. and 130° C. is preferably employed. Catalysts are not necessary for this reaction. Thus reactions between carbonates and primary amines proceed rapidly even at room temperature; higher temperatures may be advantageous, however, if the products have a high viscosity even in solvents.

The quantitative ratios (a):(b) are selected so that aminofunctional reaction products (A) are formed, which are capable, via these functions, of reacting with the epoxide groups, i.e. with the glycidyl groups, of epoxide resins (B). At least one primary amino group per molecule, preferably a plurality of primary amino groups per molecule, should preferably be present in the reaction product. Products with a character ranging from oligomeric to polymeric can be obtained by varying the quantitative ratios, wherein oligomers are particularly preferred. Thus the quantitative ratios of cyclic carbonate (a) and polyanmine (b) are preferably selected so that the ratio of the number of cyclic carbonate groups to the number of primary amino groups is from 1.0:5.0 to 1.0:1.5, for the formation of oligomers.

Components (c) which are suitable for the production of water-thinnable epoxide compounds (B) are polyalkylene polyethers comprising a terminal secondary or primary amino group and a terminal alkyl- or aryl ether group, and/or polyalkylene polyethers comprising two terminal secondary or primary amino groups. The polyalkylene polyether amines preferably have an average molecular weight (Mw) of 200 to 20,000. The polyalkylene polyether units may be based on ethyl propyl and butyl units, for example. They may be the reaction products of ethylene oxide, propylene oxide, butylene oxide or amylene oxide with monohydric and/or polyhydric alcohols, or they may be polyethers based on tetrahydrofuran. Polyalkylene polyether amines based on ethylene oxide or propylene oxide are preferred. Polyalkylene polyether monoamines are particularly preferred.

For example, those products which are sold under the trade name Jeffamine by Huntsmnan Corporation Belgium N.V. can be used as component c).

Examples of polyepoxide compounds d) which are suitable for the production of water-thinnable epoxide compounds (B) are those which were described above for the production of cyclic carbonates (a). The following should be cited as examples from the large number of polyfunctional epoxide compounds which can be used: epoxides of multiply-unsaturated hydrocarbons (e.g. vinylcyclohexane, dicyclopentadiene, cyclohexadiene, butadiene), epoxide ethers of polyhydric alcohols (e.g. ethylene-, propylene- and butylene glycols, glycerol pentaerytlritol, sorbitol polyvinyl alcohol), epoxide ethers of polyhydric phenols (e.g. resorcmol, hydroquinone, bis-(4-hydroxyphenyl)-methane, bis-(4-hydroxy-3-methyl)-methane, bis-(4-hydroxy-3,5-dibromophenyl)-methane, 1,1-bis(4-hydroxyphenyl)-ethane, 2,2-bis(4-hydroxy-3-methylphenyl)-propane, 2,2-bis-(4-hydroxy-3-chlorophenyl)-propane, 2,2-bis-(4hydroxy-3,5-dichlorophenyl)-propane, 1,1-bis-(4-hydroxyphenyl)-cyclohexane and bis-(4hydroxyphenyl)-cyclohexylmethane, as well as epoxides which have been produced by customary methods from multiply-unsaturated carboxylic acids or from singly-unsaturated carboxylic acid esters of unsaturated alcohols.

The epoxide compounds which are preferably used are polyphenol glycidyl ethers, e.g. the reaction products of epichlorohydrin and bisphenol A or bisphenol F. Epoxide resins of this type have an epoxide equivalent weight of 160 to 500. Mires of epoxide compounds can also be used.

Amino compounds, preferably polyamines, which contain at least one primary and optionally secondary or tertiary amino groups also, can be used as component (C). For example, all the amines cited above for component b) are suitable.

Aminourethanes (A) are reacted, on their own or optionally in admixture with further amines (C), with water-thinnable epoxide resins (B), wherein the ratio of the number of primary amino groups of component (A) to the number of primary amino groups of component (C) is preferably 20:1 to 1:20, and the ratio of the number of primary amino groups of (A) and (C) to the number of epoxide groups in (B) is preferably 2:1 to 20:1, most preferably 2:1 to 5:1.

The production of the epoxide-aminourethane addition products according to the invention is based on no particular rules. The following variants are particularly preferred:

(I) A polyol is placed in a reaction vessel and is reacted with a carboxylc acid diester to form cyclocarbonate (a). This is followed by further reaction with a first amount of an amnine compound (b), which is optionally used in excess, to form aminourethane (A) in the manner described, wherein inert solvents are optionally added. This is optionally followed by the addition of a second amount of component (b), the composition of which can be the same or different to that of the first amount of component (b). The product, which consists exclusively of aminourethane (A) or optionally of a mixture of (A) and excess amines, is then reacted with hydrophilic epoxide resin (B). In the course of this reaction, it must be ensured that sufficient free amino groups remain, which are employed for hardening.

(II) The isolated aminourethanes (A) are homogenised together with amines according to (b) and optionally with suitable inert solvents, and are reacted with a deficit of hydrophilic epoxide resin (B) in such a way that sufficient free amino groups remain for hardening.

(III) The hydrophilic epoxide resin (B) is reacted with an excess of polyamines (b), and the epoxide-amine addition product, which is mixed with unreacted amines, is reacted as described above with carbonate compounds according to (a) so that sufficient free amino groups remain for hardening.

The epoxide-aminourethane addition products obtained by these various methods can be mixed if need be with water-thinnable solvents.

The epoxide-aminourethane addition products (the reaction products of A), B) and optionally C)) can be used as hardeners for aqueous epoxide resin systems. They can be used as the sole hardener or in admixture with other amine hardeners.

The present invention also relates to aqueous coating media, particularly two-component coating media based on the epoxide-aminourethane addition products according to the invention and optionally on further amine hardeners, and based on an epoxide resin component. For these two-component coating media, the epoxide resin component, and the aminourethane and the amine component which is optionally associated therewith, are stored separately and are mixed before application.

Examples of further amine hardeners include all the amines cited under (b), preferably polyamines, epoxide-amine addition products, Mannich bases and polyamidoamines, which can be used on their own or preferably as mixtures. Suitable Mannich bases are produced by the condensation of polyamines, preferably diethylenetriamine, triethylenetriamine, isophoronediamine, 2,2,4- or 2,4,4-trimethylhexamethylenediamine, 1,3- and 1,4-bis-(aminomethyl)-cyclohexane, particularly meta- and para-xylylenediamine, with aldehydes, preferably formaldehyde, and mono- or polyhydric phenols comprising at least one position in their nucleus which reacts with aldehydes, for example the various cresols and xylenols, para-tert-butylphenol, resorcinol, 4,4'-dihydroxydiphenylmethane, 2,2-bis-(4'-hydroxy-phenyl)-propane, but preferably phenol. Polyamidoamines which can be use, for hardening the epoxide resin dispersions according to the invention are obtained, for example, by the reaction of polyamines with mono- or polycarboxylic acids, e.g. dimerised fatty acids. In addition to the aforementioned systems, water-soluble polyalklene diamnines and polyamines, as well as hardeners which are readily dispersible in water, such as those described in EP-A-0 000 605 for example, are preferably used as amine hardeners.

The known aqueous binder vehicle systems based on epoxide resins are suitable as the epoxide resin component for the formulation of two-component binder vehicle systems based on the amine hardeners according to the invention. The epoxide resins may be epoxide compounds such as those described for component d), for example. Modified, non-ionically stabilised epoxide resins are preferably used; examples of epoxide resins of this type which can be used are described in DE-A-36 43 751. It is also possible to use customary epoxide resins such as those which are familiar to one skilled in the art for aqueous two-component epoxide/amine systems. These may be commercially available di- or polyepoxides, for example. They are film-forming epoxide resins which exist as an aqueous dispersion or as a water-thinnable resin. Examples of polyepoxides such as these include polyglycidyl ethers based on aliphatic or aromatic diols such as bisphenol A, bisphenol F or polyallylene glycol.

The coating media according to the invention may contain customary pigments and extenders. e.g. titanium dioxide, barium sulphate, aluminium silicate, silica, zinc phosphate, carbon black, and colour-imparting or transparent organic or inorganic pigments, as well as customary lacquer additives. Examples of the latter include anti-crater agents, anti-foaming agents, levelling agents, catalysts and bonding agents. Organic solvents, preferably solvents which are miscible with water, may also be present in the coating medium. The proportion thereof should preferably be less than 10% by weight. The pigments, extenders and additives are added in the usual amounts familiar to one skilled in the art.

The pigments and/or extenders can be dispersed either in the epoxide resin component or in the amine component. Dispersion in the amine component is preferred.

The coating media according to the invention are two-component coating media, i.e. the epoxide component and the amine component are stored separately from each other, and are only mixed with each other before application. The equivalent ratio, namely the ratio of the number of primary amino groups to the number of epoxide groups, is 5:1 to 1:5, preferably 1.5:1 to 1:1.5.

The coating media according to the invention are particularly suitable for the production of primer surfacer and/or primer coats of an air-drying or forced-drying multi-layer coating. However, they can also be hardened at higher temperatures, e.g. from 80 to 140° C. Temperatures below 80° C. are preferred, however. They are suitable for the coating of vehicles and for industrial coating operations, particularly for the coating of vehicles and vehicle parts for repair purposes.

The coating media can be applied by known methods, e.g. by spraying, dipping, rolling or by doctor blade. They can be applied to a substrate as such, which is optionally pretreated, or to customary primers. They adhere well to very different substrates, such as uncoated steel sheet, rubbed-down polyvinylbutyral primer, 2C epoxide primers, or rubbed-down in-house or prior coatings. After drying and rubbing down, the coating media according to the invention can be overcoated with customary covering lacquers without problems. The latter may be single-coat covering lacquers, e.g. those with a 2C acrylate/polyisocyanate basis, or may be customary basecoat/clear coat structures. Solvent-based or water-thinnable coating media can be used for overcoating. The coating media according to the invention can be dried at room temperature, for example, or can be subjected to drying for 30 to 50 minutes at 60° C. after a ventilation aeration period of 10 to 30 minutes.

After crosslinking, homogeneously coated substrates with smooth, defect-free surfaces are obtained. The coatings exhibit no pin holes. Compared with known aqueous epoxide/polyamine systems, the coating media according to the invention exhibit a considerable reduction in thermoplasticity, which results in a considerable improvement of their rubbing-down capacity. Even after a short period of drying, the coatings can be rubbed down wet and dry without problems. This also applies to higher coat thicknesses. The coating media exhibit a satisfactory processing time of at least 120 minutes, and have a high stability (resistance to run-off) on vertical surfaces.

The present invention also relates to methods of producing multi-layer coatings and to the use of the coating media for the production of multi-layer coatings, wherein the primer surfacer and/or primer coats of multi-layer coatings in particular are produced by the coating media according to the invention.

The following examples serve to explain the invention, but do not restrict it. The following abbreviations are used:

| Abbreviations for amines | |
|---|---|
| MPDA | 2-methyl-1,5-pentanediamine (1) |
| mXDA | meta-xylylenediamine (2) |
| TMD | 2,2,4-(2,4,4)-trimethyl-1,6-hexanediamine (3) |
| Deta | diethylenediamine (4) |
| TCD-DA | tricyclodecanediamine (5) |
| IPDA | isophoronediamine (3) |
| Abbreviations for epoxide resins and carbonates thereof | |
| EP 140 | Beckopox EP 140 (6) (liquid 100% epoxide resin) |
| EP 116 | Beckopox EP 116 (6) (liquid 100% epoxide resin) |
| Epk 155 | Epikote 155 (7) (commercially available epoxide resin) |
| DG | diglycerol dicarbonate |
| BA | dicarbonate of Beckopox EP 140 |
| HD | dicarbonate of RV 1812 (8) |
| Abbreviations for other terms | |
| EV | epoxide equivalent weight (g/equiv) |
| AN | amine number (mg KOH/g) |
| Tg | glass transition temperature |
| η | viscosity |

1. General Description of the Production of Carbonates (component a)) from Epoxides—Method A 1.0 equiv. epoxide compound were heated to boiling in a 70% solution comprising methoxypropanol containing 0.2% by weight potassium iodide and 0.2% by weight triphenylphosphane. Gaseous carbon dioxide at a pressure of 1 bar was passed into the solution until a conversion of 97%, as measured by the increase in the epoxide equivalent, was exceeded. The introduction of carbon dioxide was stopped and the solvent was disftlled off under vacuum (50 mbar, 130° C.).

2. General Description of the Production of Carbonates (component a)) from Epoxides—Method B.

1.0 equiv. of a 1,2- (or 1,3-) dihydroxy compound was heated under refux with 1.2 moles dimethyl carbonate and 0.5% by weight potassium carbonate. In the course of this procedure, the boiling point fell from 90° C. (boiling point of pure dimethyl carbonate) to 64° C. (methanol). After boiling, for 120 minutes at 64° C., the excess dimethyl carbonate and methanol were distilled off, and a vacuum of 50 mbar was finally maintained for 60 minutes at a temperature of 130° C.

3. General Description of the Production of Aminourethanes A) from Carbonates a) and Amines b).

The amine or the amine mixture was mixed with solvent (optional) and heated to 70° C. The carbonate, dissolved in a solvent (optional), was carefully added drop-wise at this temperature (see Table 6.1.). The rate of drop-wise addition was dependent on the exothermic reaction which then set in, for which the temperature must not exceed 140° C. (achieved by cooling and reducing the rate of drop-wise addition). After the drop-wise addition, the batch was maintained at 140° C. until the reaction, as measured by the amine number, had exceeded a conversion of 90%. After cooling to 90° C., the batch was diluted to an 80% aqueous solution with deionised water.

4. General Description of the Production of Emulsifiers (Component B) Based on Epoxide Resins d) and Amino-Terminated Polyalkylene Polyethers c)).

The calculated amount of epoxide resin (see Table 6.2. for the type and amount) and amino-terminated polyaliylene polyether (known by the trade name Jeffamine, supplied by Huntsman Corporation Belgium N.V. (Belgium)) were reacted at 120° C. until the calculated epoxide equivalent was reached. The amine number and an apparent amine number (titration with and without tetrabutylammonium bromide) were measured for this purpose. Samples were dissolved in glacial acetic acid/acetone (1:1 v/v) and titrated with 0.1 N perchioric acid dissolved in glacial acetic acid. The epoxide equivalent (EV) was determined according to the following formula:

$$EV = \frac{56,110}{AN(\text{with}) - AN(\text{without})}$$

wherein
AN (with) denotes: titration with an excess of tetrabutylammonium bromide
AN (without) denotes: tration without tetrabutylammonium bromide 4A) Production of a Comparison Emulsifier E6

A comparison emulsifier was produced from polyethylene glycol and a bisphenol A-diglycidyl ether/bisphenol F-diglycidyl ether mixture according to EP-A-0 000 605, Example 1A).

5. General Description of the Production of the Aqueous Hardeners According to the Invention.

The amounts of monomeric amine or of a mixture of monomeric amines given in Table 6.3. were homogeneously mixed with aminourethane at 40° C. The desired amount of epoxy-functional emulsifier was carefully added thereto within a temperature range of 60–80° C. The batch was maintained within this temperature range after the addition. The reaction conversion was determined by titration of the amine numbers with and without tetrrbutylammonim bromide. The addition was terminated when the difference in amine numbers was<1, and the product was diluted with deionised water to the 80% form as supplied. The epoxide hardener was thus produced in its final form for its intended purpose of use.

6. Tabular Summary of Some Aqueous Hardeners According to the Invention

The aqueous hardeners and their precursors which are given in the following Tables constitute a selection from all the possible hardeners according to the invention.

6.1 Table of minourethanes
6.2 Table of emulsifiers
6.3 Table of aqueous hardeners

TABLE 6

Table of aminourethanes (component A))

| Description | Amine 1 b) | Amine 2 b) | Carbonate a) | Method | Ratio# | Amino-urethane AN | η (mPa · s/25° C.) | Tg |
|---|---|---|---|---|---|---|---|---|
| U1 | mXDA | TMD | DG | 2 | 2:1:2 | 164 | 2900 | 0 |
| U2 | mXDA | MPDA | DG | 2 | 2:1:2 | 166 | 2100 | 0 |
| U3 | mXDA | 0 | BA | 1 | 2:1 | 251 | 0 | 47° C. |
| U4 | Deta | 0 | BA | 1 | 3:2 | 203 | 0 | 43° C. |
| U5 | mXDA | 0 | HD | 1 | 3:2 | 112 | 8600 | 0 |

The ratio is given as the amino group equivalents of amine 1 to the amino group equivalents of amine 2 to the carbonate equivalents.

TABLE 6.2

Table of emulsifiers (component B))

| | Characteristic properties of the emulsifier | | | | | | | |
|---|---|---|---|---|---|---|---|---|
| | d) epoxide resin 1 | | d) epoxide resin 2 | | c) Jeffamine | | | |
| Description | Type | Amount weighed in | Type | Amount weighed in | Type | Amount weighed in | EV | η (mPa · s/25° C.) |
| E1 | EP 140 | 603 g | 0 | 0 | M-2070 | 440 g | 355 | 7300 |
| E2 | EP 140 | 603 g | 0 | 0 | M-1000 | 440 g | 420 | 9900 |
| E3 | EP 140 | 550 g | 0 | 0 | M-2070 | 450 g | 379 | 7100 |

TABLE 6.2-continued

Table of emulsifiers (component B))

Characteristic properties of the emulsifier

| | d) epoxide resin 1 | | d) epoxide resin 2 | | c) Jeffamine | | | |
|---|---|---|---|---|---|---|---|---|
| Description | Type | Amount weighed in | Type | Amount weighed in | Type | Amount weighed in | EV | η (mPa · s/25° C.) |
| E4 | EP 116 | 550 g | 0 | 0 | M-2070 | 450 g | 370 | 6900 |
| E5 | EP 116 | 400 g | Epk 155 | 200 g | M-2070 | 400 g | 330 | 21000 |
| E6 (comparison) | | | | | | | 379 | 9600 |

TABLE 6.3

Table of aqueous hardeners

Aqueous hardeners

| | C) amine 1 | | C) amine 2 | | A) aminourethane | | B) emulsifier | | | |
|---|---|---|---|---|---|---|---|---|---|---|
| Description | Type | Amount weighed in | Type | Amount weighed in | Type | Amount weighed in | Type | Amount weighed in | AN | η (mPa · s/25° C.) |
| W1 | mXDA | 1020 g | IPDA | 1190 g | U1 | 1436 g | E1 | 3550 g | 217 | 16.1 |
| W2 | mXDA | 1007 g | TCD-DA | 1358 g | U2 | 1515 g | E2 | 4200 g | 273 | 15.4 |
| W3 | mXDA | 1010 g | IPDA | 1260 g | U3 | 963 g | E3 | 3790 g | 249 | 24.9 |
| W4 | mXDA | 997 g | TMD | 1110 g | U4 | 1100 g | E4 | 3700 g | 256 | 21.0 |
| W5 | mXDA | 1029 g | IPDA | 1150 g | U5 | 2005 g | E5 | 3300 g | 273 | 17.5 |
| W6 (comparison) | mXDA | 1010 g | IPDA | 1260 g | U3 | 963 g | E6 | 3790 g | | |

7. Production of Primer Surfacers

Aqueous 2C primer surfacers were formulated from the aqueous hardeners listed in Table 6.3. For this purpose, 48.5 g of aqueous hardeners W1–W5 and of comparison hardener W6 were each well mixed with 350 g of deionised water. 13 g of a commercially available polyurethane thickener and 1.3 g of a corrosion inhibitor were added to the mixure and were likewise well mixed. The following pigments and extenders were dispersed in the customary manner in this mixture:

32 g silica
114 g barium sulphate
95 g aluminium silicate
104 g titanium dioxide
5 g iron oxide yellow.

The following amounts of a commercially available aqueous epoxide resin (53%, Beckopox EP 384 w supplied by Hoechst AG) were added shortly before application to the polyamine components thus obtained and both components were intensively mixed by stirring in each case:

| Aqueous hardener | Amount of epoxide resin |
|---|---|
| W1 | 311 g |
| W2 | 391 g |
| W3 | 357 g |
| W4 | 367 g |
| W5 | 391 g |
| W6 (comparison) | 357 g |

Application of the Coating Media

The primer surfacer coating media (primer surfacers 1–5 corresponding to the different hardeners W1–W5, and comparison primer surfacer W6) were each sprayed on to a steel substrate which had been pre-coated with a cataphoresis primer and were dried for 60 minutes at 60° C. After drying and rubbing down, the primer surfacer coats were each overcoated with a customary solvent-based 2C covering lacquer (with an acrylate/polyisocyanate basis). Primer surfacer coating media W1–W5 each exhibited excellent flow. Their surface quality was very good. No surface defects (pin holes, blisters) could be detected, even after overcoating with the covering lacquer. The primer surfacer coats obtained could be rubbed down very well, wet and dry, at coat thicknesses of 30 and 130 μm.

The material removed by abrasion was used as a criterion for assessing their rubbing-down capacity. For this purpose, the samples were rubbed down for 30 seconds on a commercial available eccentric abrasion machine (loaded with 2 kg, P 400 abrasive paper, diameter of the abrasive disc 20 cm) and the abrasion was subsequently determined gravimetrically.

A comparison of the primer surfacers tested is presented in the following Table.

| Primer surfacer | Surface quality | Rubbing-down capacity/material abraded |
|---|---|---|
| 1 | very good | 1.0 g |
| 2 | very good | 1.2 g |
| 3 | very good | 1.2 g |
| 4 | very good | 1.0 g |
| 5 | very good | 1.1 g |
| 6 (comparison) | good | 0.4 g |

What is claimed is:

1. Aminourethane hardeners suitable for aqueous epoxide-based coating media, obtained by the reaction of
    A) one or more aminourethanes which are obtained by the reaction of
        a) compounds comprising members selected from the group consisting of at least one 2-oxo-1,3-dioxolane group and 2-oxo-1,3-dioxane group, hereinafter denoted as a cyclic carbonate group, with
        b) one or more amines comprising at least one primary amino group, wherein the ratio of the number of cyclic carbonate groups to the number of primary amine groups is 1:10 to 1:1.1, with
    B) one or more water-thinnable epoxide compounds, which are obtained by the reaction of
        c) at least one member selected from the group consisting of one or more polyalkylene polyethers comprising at least one member selected from a primary α-amino group and a secondary α-amino group together with an ω-terminal alkyl ether group or an ω-terminal aryl ether group and one or more polyalkylene polyethers comprising at least one member selected from two primary α,ω-terminal amino groups and two secondary α,ω-terminal amino groups, each with a weight average molecular weight (Mw) of 200 to 20,000, with
        d) one or more epoxide compounds comprising at least two epoxide groups per molecule and an epoxide equivalent weight of 100 to 2000, wherein the ratio of the number of primary and secondary amino groups of component c) to the epoxide groups of component d) is 1:2 to 1:20, and the epoxide equivalent weight of the condensation products obtained from c) and d) is between 150 and 8000, and
    (C) optionally one or more amines which are different from A) and which comprise at least one primary amino group,
wherein the ratio of the number of primary amino groups of A) and C) to the number of epoxide groups of B) is 2:1 to 20:1.

2. Aminourethane hardeners according to claim 1, characterised in that amines b) and optionally amines C) are selected independently of each other from the following groups:
    b1) primary diamines,
    b2) amines comprising three or more primary amino groups,
    b3) primary diamines which contain further secondary and/or tertiary amino groups,
    b4) amines which comprise three or more primary amino groups and which contain further secondary and/or tertiary amino groups.

3. Aminourethane hardeners according to claim 2, characterised in that amines b2) and optionally amines (C) are selected, independently of each other, from the group comprising polyallene polyamines, polyoxyalkylene polyanines, polyaminoalkyl aromatics, cycloalkylene polyamines and reaction products of di- or polyamines with compounds which comprise at least one terminal epoxy group.

4. Aminourethane hardeners according to claim 1, characterised in that compounds, a) which comprise at least one cyclic carbonate group are obtainable by the reaction of glycidyl ethers of polyhydric alcohols or phenols, the hydrogenation products thereon or novolacs, with carbon dioxide.

5. Aminourethane hardeners according to claim 1, characterised in that compounds a) which comprise at least one cyclic carbonate group are obtainable by the reaction of polyhydric alcohols with carboxylic acid esters.

6. Arninourethane hardeners according to any one of claim 1, characterised in that during the synthesis of the aminourethanes the ratio of the number of cyclic carbonate groups to the number of primary amino groups is 1:5 to 1:1.5.

7. A method of producing aminourethane hardeners according to any one of claims 1, characterised in that one or more aminourethanes (A), possibly premixed with one or more amines (C), are reacted with one or more epoxide compounds (B), wherein a ratio of 2:1 to 20:1 is selected for the number of primary amino groups of (A) and (C) to the numbers of epoxide groups of (B).

8. Aminourethane hardeners according to claim 1, characterised in that aminourethanes (A) are used in admixture with further amines (C), wherein the ratio of the number of primary amino groups of (A) to the number of primary amino groups in (C) of 20:1 to 1:20.

9. Aqueous coating media containing
    one or more epoxide resins,
    one or more aminourethane hardeners according to claim 1,
    optionally one or more amine hardeners which are different from the one or more aminourethane hardeners, and
    optionally pigments, extenders, one or more organic solvents, water and/or customary additives.

10. A method of producing multi-layer coatings by applying a primer coat and optionally a primer surfacer coat to a substrate to be coated and optionally applying one or more further coating media coats, characterised in that a coat of a coating medium according to claim 9 is applied as at least one of the primer coat and/or primer surfacer coat.

11. A method for using the aminourethane hardeners according to claim 1, comprising adding one or more of said hardeners to an aqueous epoxide resin system.

12. A method according to claim 11, for using the aminourethane hardeners wherein the aqueous epoxide resin system comprises an aqueous epoxide-based coating medium.

13. A method for using the coating media according to claim 9, comprising applying the coating media for the production of multi-layer coatings, for coating of vehicles and vehicle parts.

14. A method according to claim 7 wherein aminourethanes (A) are used in admixture with further amines (C), wherein the ratio of the number of primary amino groups of (A) to the number of primary amino groups in (C) of 20:1 to 1:20.

* * * * *